United States Patent
Katagiri (10) Patent No.: US 7,095,029 B2
(45) Date of Patent: Aug. 22, 2006

(54) SCINTILLATORS FOR NEUTRON DETECTION AND NEUTRON DETECTORS USING THE SAME

(75) Inventor: Masaki Katagiri, Ibaraki (JP)

(73) Assignee: Japan Atomic Energy Research Institute, Tokyo (JP)

(*) Notice: Subject to any disclaimer, the term of this patent is extended or adjusted under 35 U.S.C. 154(b) by 355 days.

(21) Appl. No.: 10/372,884

(22) Filed: Feb. 26, 2003

(65) Prior Publication Data

US 2003/0160178 A1 Aug. 28, 2003

(30) Foreign Application Priority Data

Feb. 26, 2002 (JP) .............................. 2002-050092

(51) Int. Cl.
*G01T 3/06* (2006.01)

(52) U.S. Cl. .................................. 250/390.11; 250/362

(58) Field of Classification Search ........... 250/390.11, 250/362, 367, 368, 363.01, 370.05, 370.06, 250/370.13, 390.01, 390.04, 370.04, 483.1
See application file for complete search history.

(56) References Cited

U.S. PATENT DOCUMENTS

| | | | | |
|---|---|---|---|---|
| 4,419,578 A | * | 12/1983 | Kress ..................... | 250/390.01 |
| 5,298,756 A | * | 3/1994 | McCollum et al. ..... | 250/390.07 |
| 5,334,840 A | * | 8/1994 | Newacheck et al. ..... | 250/483.1 |
| 5,969,359 A | * | 10/1999 | Ruddy et al. .......... | 250/370.05 |
| 6,078,052 A | * | 6/2000 | DiFilippo .................. | 250/367 |
| 6,388,260 B1 | * | 5/2002 | Doty et al. ............. | 250/390.01 |
| 6,471,888 B1 | * | 10/2002 | Mihalczo et al. ....... | 252/301.17 |
| 6,727,504 B1 | * | 4/2004 | Doty ...................... | 250/390.01 |
| 6,771,730 B1 | * | 8/2004 | Dowben et al. ........... | 376/155 |
| 6,812,469 B1 | * | 11/2004 | Katagiri ...................... | 250/368 |
| 2003/0062486 A1 | * | 4/2003 | Shimizu et al. .......... | 250/483.1 |

OTHER PUBLICATIONS

Carel W.E. van Eijk, *"Inorganic-scintillator Development"*, Nuclear Instruments and Methods in Physics Research A460 (2001) 1-14.

N. Senguttuvan, et. al., *"Crystal growth and luminescence properties of $Li_2B_4O_7$ single crystals doped with Ce, In, Ni, Cu and Ti ions,"*, Nuclear Instruments and Methods in Physics Research A 486 (2002) 264-267.

Y. Kutomi, et al., *"The Effect Of Pre-Irradiation Annealing On TL and PTTL Glow Curves of Pure $Li_2B_4O_7$ Single Crystals,"* Radiation Protection Dosimetry, vol. 65, Nos. 1-4, pp. 333-337 (1996) Nuclear Technology Publishing.

I.N. Ogorodnikov, et al., *"Thermoluminescence, Point Defects and Recombination Processes in BeO and $LiB_3O_5$ Single Crystals,"* Radiation Protection Dosimetry Vo. 65, Nos. 1-4, pp. 109-112 (1996) Nuclear Technology Publishing.

* cited by examiner

*Primary Examiner*—Otilia Gabor
(74) *Attorney, Agent, or Firm*—Banner & Witcoff, Ltd.

(57) ABSTRACT

A neutron detecting scintillator that has a very short decay time, that can capture neutrons in high efficiency and that is composed of light elements comprises the $Li_2B_4O_7$ single crystal or the $^6Li$ and $^{11}B$ or $^{10}B$ enriched $^6Li_2{}^{11}B_4O_7$ or $^6Li_2{}^{10}B_4O_7$ single crystal, in which $^6Li$ and $^{11}B$ or $^{10}B$ have large neutron capture cross sections and fluorescence that is emitted from an ionizing radiation generated through their neutron capture reaction has a short-lived component not longer than 10 ns.

22 Claims, 12 Drawing Sheets

SCINTILLATORS FOR NEUTRON DETECTION AND NEUTRON DETECTORS USING THE SAME

This application is based upon and claims the benefit of priority from Japanese Patent Application No. 50092/2002, filed Feb. 26, 2002, the entire contents of this application are incorporated herein by reference.

BACKGROUND OF THE INVENTION

This invention relates to scintillators for use in neutron detection and neutron detectors that use them to detect neutrons. The invention is characterized by the use of a scintillator that has small fluorescent yield but with a very short decay time so that neutrons of high incident rate can be detected. The invention is also characterized by its ability to acquire a two-dimensional neutron image at very high speed.

In particular, the invention enables two-dimensional neutron imaging at high counting rate and thus makes great contribution to the advancement of studies in materials physics and structural biology based on neutron scattering and the like that rely on the time-of-flight (TOF) method using pulsed neutrons generated by a high-intensity positron accelerator. The invention can also be employed in similar studies using a nuclear reactor as a neutron source. In addition, the invention will make great contribution to the advancement of studies in materials physics and structural biology based on X-ray scattering and the like that employ high-intensity synchrotron radiation. Because of having high sensitivity to neutrons, the invention can also be applied to instrumentation for monitoring neutrons from nuclear reactors or as neutron dose monitors.

Conventionally, Li glass scintillators or LiI(Eu) scintillators have been used as neutron detectors or neutron imaging detectors. These scintillators for neutron detection have reasonably high fluorescent yield but they also have high sensitivity to gamma rays. They also have long decay times (60 ns for the Li glass scintillator and 1.4 μs for LiI(Eu)) and have had difficulty achieving measurement at high counting rate ($\geq 10$ Mcps) (Knoll, "Radiation Detection and Measurement", Japanese translation made by Kimura and Sakai and entitled "Hoshasen Keisoku Handbook", 2nd ed.)

The $Li_2B_4O_7$ single crystal is referred to in a review article written by C. W. E. van Eijk about scintillators for use in neutron detection [Nucl. Instr. and Meth. A460(2001) 1–14]. I. K. Kamenskikh et al. (SCINT 97/1997, P. 65) performed fluorescence measurement with uv radiation and confirmed that a wavelength spectrum for fluorescence peaked at 340 nm. However, no measurement has yet been made of the neutron-dependent fluorescence characteristics or the characteristics for neutron detection by the combination of the scintillator with a photomultiplier tube and the neutron-dependent decay time which is the most important in neutron detection has not been measured, either.

With the recent use of high-intensity pulsed neutron sources that are created in high-intensity positron accelerators, more intense pulsed neutrons are produced and the produced neutrons have a wider energy spectrum; this makes it essential to develop a detector that will not be saturated even at high counting rate but which can detect neutrons and produce a two-dimensional neutron image in a simple way. Also indispensable is neutron detection with reduced gamma-ray background and it has been desired to develop a scintillator for neutron detection that is composed of as light elements as possible. As a further problem, if the fluorescent yield is unduly high, neutrons coming in at high concentration within a short time will cause the scintillator to emit such a large quantity of fluorescence that the photomultiplier tube is saturated temporarily. It has therefore been desired to develop a scintillator that has a very short decay time ($\leq 10$ ns) with reasonable fluorescent yield.

DISCLOSURE OF THE INVENTION

For detecting neutrons at high counting rate, the use of a neutron detecting scintillator of short decay time is essential. Therefore, the inventors prepared a $Li_2B_4O_7$ single crystal and measured its fluorescence characteristics in response to neutrons, as well as the neutron detection characteristics of the crystal in combination with a photomultiplier tube. As a result, it was found that the $Li_2B_2O_7$ single crystal yielded a short-lived fluorescent component with a decay time of 10 ns or less. The inventors therefore decided to use this characteristic in neutron detection. In fact, however, a little longer-lived fluorescent component remained in the scintillator made of the $Li_2B_2O_7$ single crystal; hence, the inventors used a photomultiplier tube to pick up the fluorescence from the $Li_2B_2O_7$ single crystalline scintillator as a fast pulsed current signal with a pulse duration of 30 ns or shorter; the picked up signal was subjected to pulse height analysis, either directly or after amplification with a fast pulse amplifier, and picked up as a pulsed neutron signal.

In order to increase the neutron capture efficiency of the $Li_2B_4O_7$ single crystal, the inventors chose to use a single crystal enriched in a lithium isotope $^6Li$ or a boron isotope $^{10}B$ in view of their contribution to the capture of neutrons.

Reducing the effect of gamma rays is indispensable to neutron detection or imaging and a scintillator composed of light elements is essential to this end. This requirement is also met by the $Li_2B_4O_7$ single crystal since the constituents Li, B and O are each a light element.

In the invention, a photomultiplier tube is used to pick up a fast pulsed current signal with a pulse duration of 30 ns or shorter and the picked up signal is subjected to pulse height analysis. Compared to the charge integration method employed in neutron detection with the conventional scintillators, the present invention allows fast neutron detection in high S/N ratio with reduced gamma-ray background signal.

When the $Li_2B_4O_7$ single crystal is used in neutron imaging, it is combined with wavelength shifting fibers. In this neutron imaging technique, the issue to be addressed is matching between the fluorescent wavelength spectrum from the $Li_2B_4O_7$ single crystal and the fluorescent absorption wavelength band of the wavelength shifting fibers. To this end, the fluorescent absorption wavelength bands of commercial wavelength shifting fibers were measured in detail and an absorption wavelength band not listed in the catalogs of the fibers was identified and employed to increase the efficiency of wavelength shifting, thereby enabling high-performance neutron imaging.

DETAILED DESCRIPTION OF THE INVENTION

The present invention is described below in greater detail with reference to examples.

EXAMPLE 1

Figure 1:
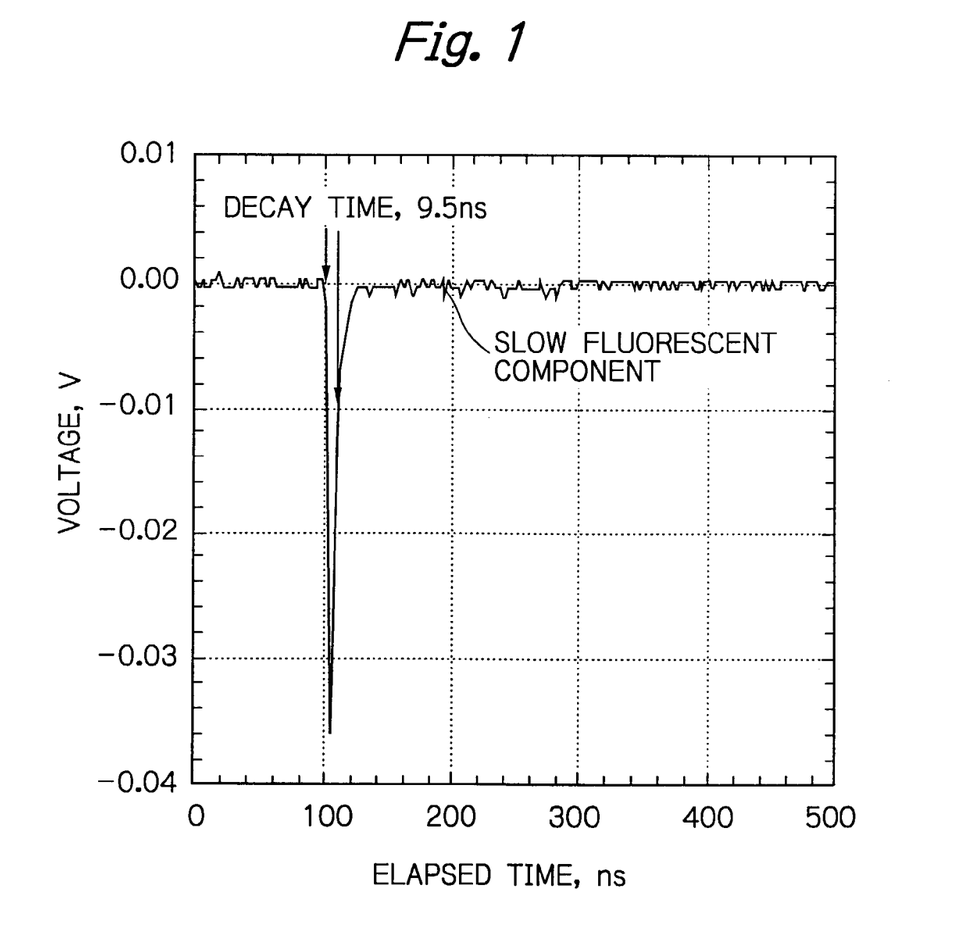
FIG. 1 is a graph showing a typical waveform for the pulsed current signal that was output upon neutron incidence from a photomultiplier tube fitted with a neutron detecting scintillator made of the $Li_2B_4O_7$ single crystal.

The neutron detecting scintillator used in Example 1 had neutrons launched into the $Li_2B_4O_7$ single crystal and took advantage of the following two facts: a lithium isotope $^6Li$ or a boron isotope $^{10}B$ has a large neutron capture cross-section and the ionizing radiation generated through their neutron capture reaction emits fluorescence the short-lived component of which has a decay time of 10 ns and less. FIG. 1 shows a typical waveform for the pulsed current signal that was output upon neutron incidence from a photomultiplier tube fitted with the neutron detecting scintillator made of the $Li_2B_4O_7$ single crystal. The $Li_2B_4O_7$ single crystal was one available in a thickness of 0.4 mm from NEL and the photomultiplier tube was R647P manufactured by Hamamatsu Photonics; a voltage of −900 V was applied for observation. The short-lived fluorescent component had a very short decay time of 9.5 ns as determined from the waveform in FIG. 1. A little slower component was also observed as a minor component. The average fluorescent yield was about 4% of the value from the Li glass scintillator. However, the output pulsed current signal was obtained at a reasonably higher S/N ratio than the zero-signal level and this is sufficient evidence for the practical feasibility of the scintillator in neutron detection. In Example 1, the $Li_2B_4O_7$ single crystal was used but a $LiB_3O_4$ single crystal of a slightly varied composition can equally be employed in Example 1 and subsequent Examples 2–8.

EXAMPLE 2

Figure 2:
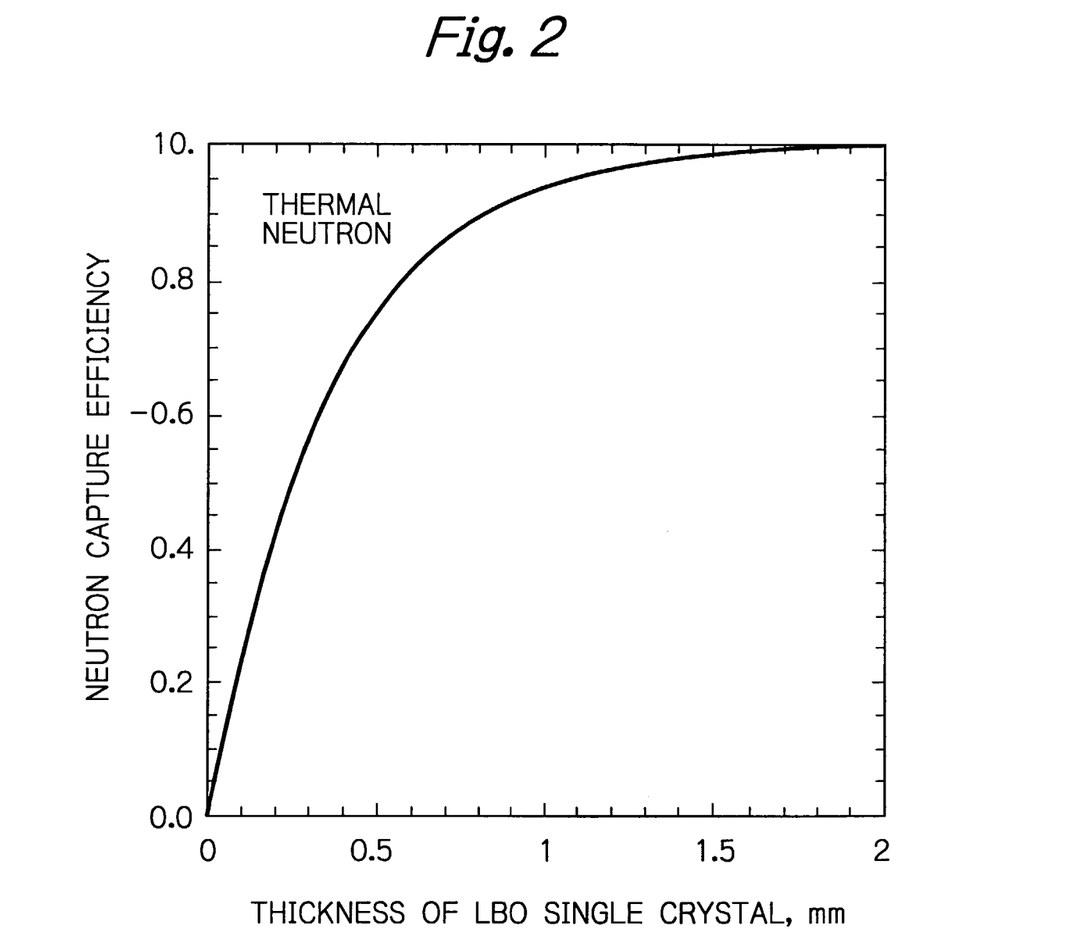
FIG. 2 is a graph in which the efficiency at which a $Li_2B_4O_7$ single crystal using natural Li and natural B could capture thermal neutrons (25 meV) is shown as a function of the crystal thickness.

The neutron detecting scintillator used in Example 2 was composed of a $Li_2B_4O_7$ single crystal using both natural Li having a natural abundance of 7.5% and natural B having a natural abundance of 20%. The efficiency at which the single crystal could capture thermal neutrons (25 meV) was calculated on the basis of the neutron capture cross-sections of natural Li and B. The result is shown in FIG. 2 as a function of the crystal thickness. At a crystal thickness of 1 mm, the thermal neutron capture efficiency was 94%, demonstrating that the crystal is practically feasible as a neutron detecting scintillator if it is thin. A salient advantage of Example 2 is low cost since the $Li_2B_4O_7$ single crystal is commercially available from NEL or Chichibu-Fuji.

EXAMPLE 3

The neutron detecting scintillator used in Example 3 was composed of a $^6Li_2^{11}B_4O_7$ single crystal that had Li enriched 95% in isotope $^6Li$ and B enriched 99% in isotope $^{11}B$. In Example 3, neutrons were captured by the $^6Li$ reaction and fluorescence emission was increased by releasing an ionizing radiation of greater energy. To be specific, the $^6Li(n,^4H)^3He$ reaction releases 2.75 MeV $^3H$ and 2.05 MeV $^4He$ and the two released isotopes are used as ionizing radiations. The emitted fluorescence is at least twice the fluorescence (branching ratio=93%) emitted from 0.83 MeV $^4He$ and 1.47 MeV $^7Li$ that are generated through the $^{10}B$ neutron capture reaction and the fluorescence (branching ratio=93%) emitted from 1.0 MeV $^4He$ and 1.8 MeV $^7Li$ that are also generated through the $^{10}B$ neutron capture reaction. Hence, the single crystal of Example 3 may be employed in neutron imaging that requires high fluorescent yield or in the case where it is required to reduce the gamma-ray background.

In the case under consideration, $^6Li$ has a neutron capture cross-section of 1.55 Σ ($mm^{-1}$) whereas the residual 1% $^{10}B$ has a neutron capture cross-section of 0.13 Σ ($mm^{-1}$), which is less than 10% of the value for $^6Li$; it is therefore seen that the $^6Li$ neutron capture reaction is the dominant factor in the neutron capture process. From the foregoing results, it can be seen that if one wants to capture neutrons solely by the $^6Li$ reaction, boron must be enriched by at least 99% in $^{11}B$.

Figure 3:
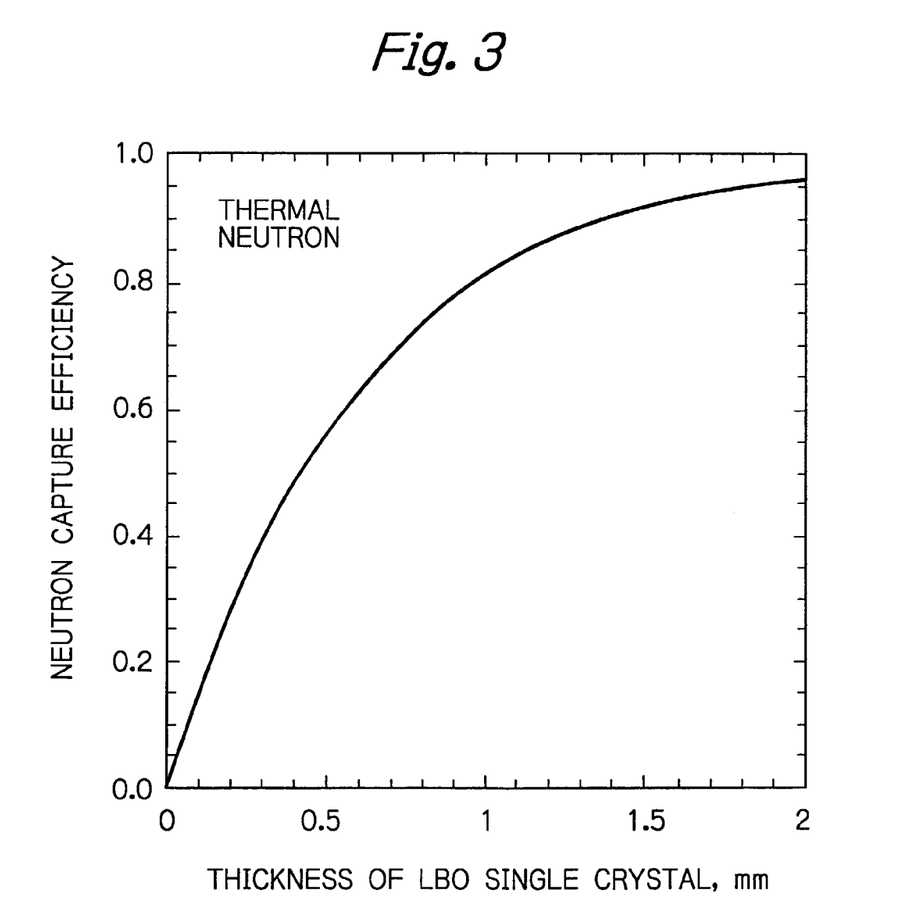
FIG. 3 is a graph in which the efficiency at which a $^6Li_2^{11}B_4O_7$ crystal having Li enriched 95% in $^6Li$ and B enriched 99% in $B^{11}$ could capture thermal neutrons (25 meV) is shown as a function of the crystal thickness.

In the next place, the efficiency at which the $^6Li_2^{11}B_4O_7$ single crystal could capture thermal neutrons was calculated on the basis of the neutron capture cross-sections of $^6Li$ and $^{11}B$. The result is shown in FIG. 3 as a function of the crystal thickness. At a crystal thickness of 1 mm, the thermal neutron capture efficiency was 82%, which increased to 96% at a thickness of 2 mm; this demonstrates that the crystal is practically feasible as a neutron detecting scintillator.

EXAMPLE 4

The neutron detecting scintillator used in Example 4 was composed of a $Li_2^{10}B_4O_7$ single crystal that used natural Li and which had Li enriched 95% in $^{10}B$. The objective of Example 4 was to maximize the neutron capture efficiency with a thin scintillator by utilizing the fact that the neutron capture cross-section of $^{10}$B is about four times as large as the cross-section of $^{6}$Li. This is essential if one wants to expand the detection range beyond epithermal neutrons having higher energy than thermal neutrons. Speaking of lithium (Li), whether Li is enriched by 95% in $^{6}$Li or natural Li containing 7.5% $^{6}$Li is employed, the effect that can be finally obtained is no more than 2% since $^{10}$B has a by far larger neutron capture cross-section. Therefore, considering the very high cost of $^{6}$Li, natural Li will suffice.

Figure 4:
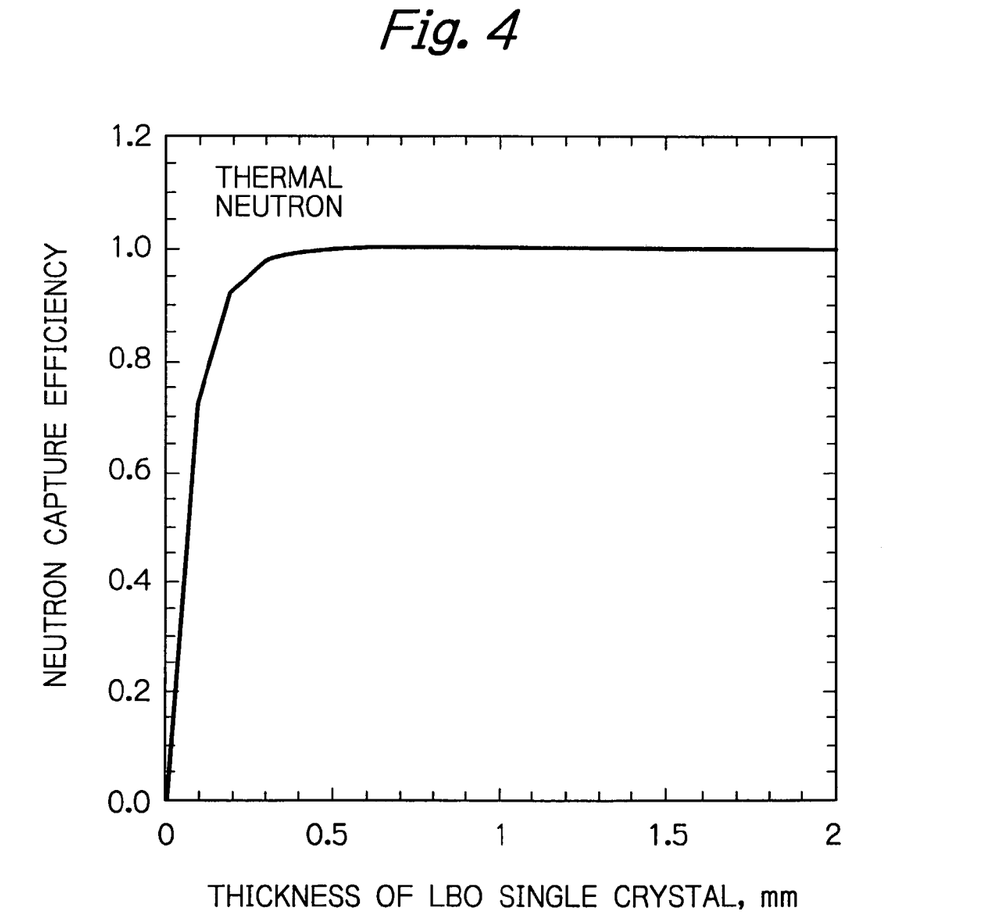
FIG. 4 is a graph in which the efficiency at which a $Li_2^{10}B_4O_7$ single crystal using natural Li and having B enriched 95% in $^{10}B$ could capture thermal neutrons (25 meV) is shown as a function of the crystal thickness.

First, the efficiency at which the $Li_2{}^{10}B_4O_7$ single crystal could capture thermal neutrons was calculated on the basis of the neutron capture cross-sections of natural Li and $^{10}$B. The result is shown in FIG. 4 as a function of the crystal thickness. Even at a crystal thickness of 0.1 mm, the thermal neutron capture efficiency was 72%, which increased to nearly 100% at a thickness of 1 mm; this demonstrates that the crystal has very high detection sensitivity.

Figure 5:
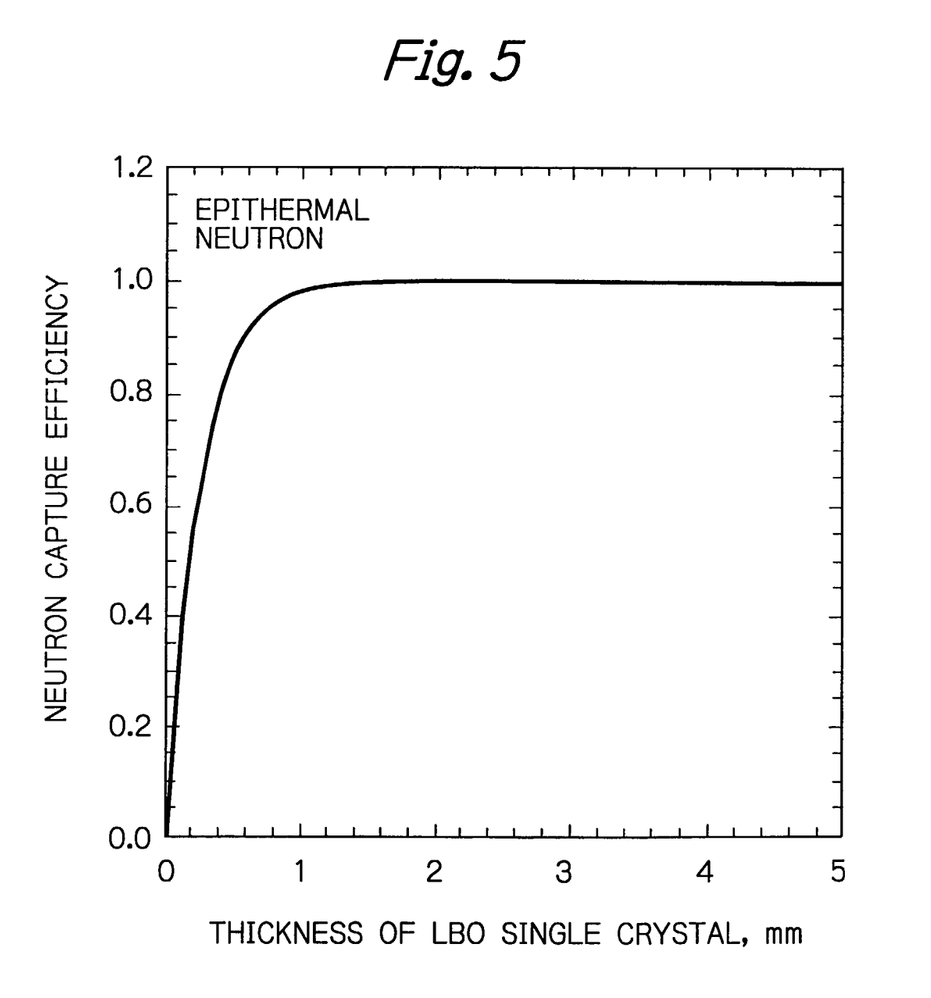
FIG. 5 is a graph in which the efficiency at which a $Li_2^{10}B_4O_7$ single crystal using natural Li and having B enriched 95% in $^{10}B$ could capture epithermal neutrons (400 meV) is shown as a function of the crystal thickness.

In the next place, the efficiency at which the $Li_2{}^{10}B_4O_7$ single crystal could capture epithermal neutrons (400 meV) was calculated on the basis of the neutron capture cross-sections of $^{6}$Li and $^{10}$B. The result is shown in FIG. 5 as a function of the crystal thickness. At a crystal thickness of 1 mm, the epithermal neutron capture efficiency was 98%, which increased to nearly 100% at a thickness of 2 mm; this demonstrates that the crystal has very high detection sensitivity.

EXAMPLE 5

Figure 6:
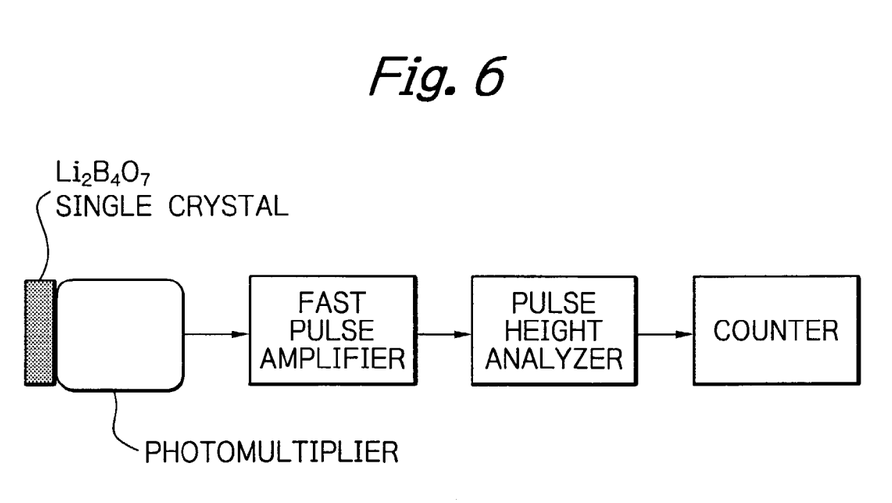
FIG. 6 is a block diagram of a neutron detector that consists of a neutron detecting scintillator made of the $Li_2B_4O_7$ single crystal, a photomultiplier tube, a fast pulse amplifier, a pulse height analyzer and a counter and which detects neutrons by the pulse counting method.

FIG. 6 is a block diagram of the neutron detector used in Example 5. It employed a neutron detecting scintillator composed of a 0.4-mm thick $Li_2B_4O_7$ single crystal that used natural Li and natural B and which was available from NEL. The detector used R647P of Hamamatsu Photonics as a photomultiplier tube. To the photomultiplier tube, the $Li_2B_4O_7$ single crystal was attached and surrounded with an aluminum foil and a light-proof sheet to reflect fluorescence and prevent incidence of light. Neutrons were launched into the scintillator composed of the $Li_2B_4O_7$ single crystal and the resulting neutron capture reaction generated an ionizing radiation which in turn emitted fluorescence with a decay time of no longer than 10 ns. The emitted fluorescence was multiplied with a photomultiplier tube and picked up as a fast pulsed current signal having a pulse duration of no longer than 30 ns. A voltage of −900 V was applied to the photomultiplier tube. A typical waveform of the pulsed current signal output from the photomultiplier tube was as depicted in FIG. 1. This signal was amplified 10-fold with PM Amplifier No. 18 of Hoshin Denshi which was a fast pulse amplifier having a frequency band of 100 MHz. The amplified pulsed signal was subjected to pulse height analysis with Discriminator No. 19 of Hoshin Denshi which was a pulse height analyzer having a maximum input rate of 60 MHz. After pulse height analysis, the neutron detection signal was counted with 120 MHz Counter No. 26 of Hoshin Denshi (CAMAC module operating at 120 MHz) to give counts of neutron incidence.

With this design, neutron detection could be performed without saturation of the scintillator and the electronic circuitry even when neutrons were incident at a very high counting rate of 10 Mcps or more.

EXAMPLE 6

Figure 7:
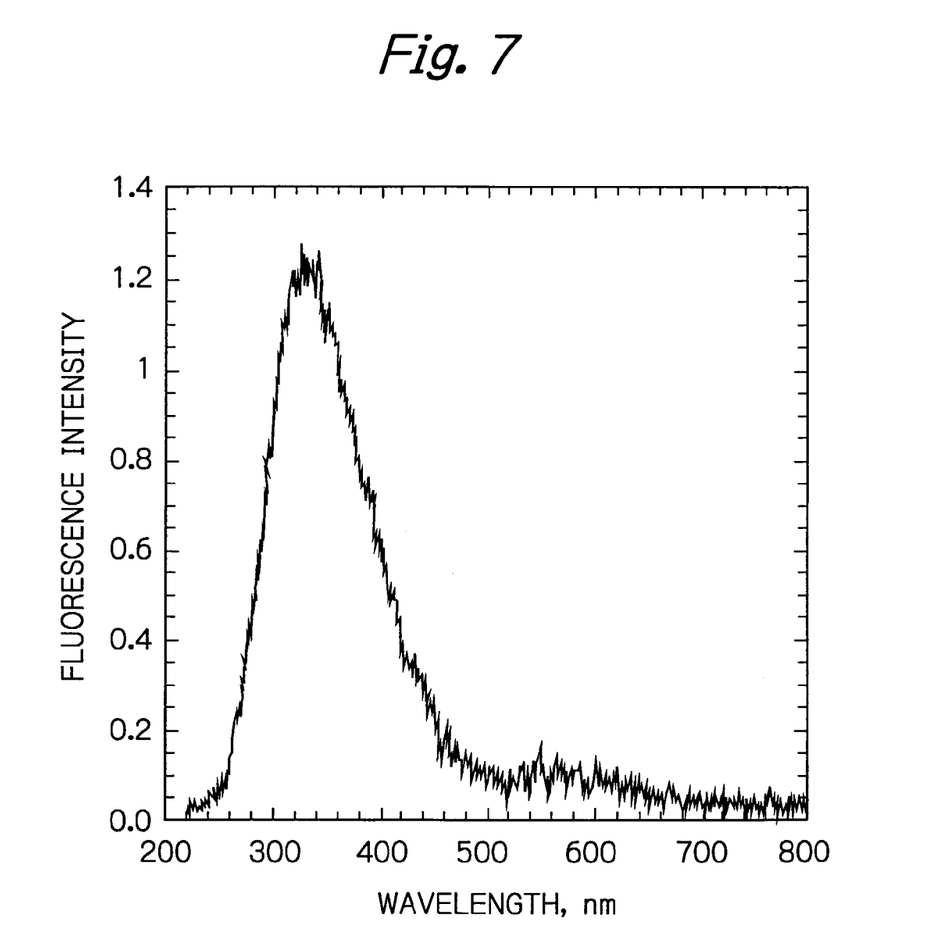
FIG. 7 is a graph showing a fluorescence wavelength spectrum obtained by applying alpha particles to a neutron detecting scintillator made of the $Li_2B_4O_7$ single crystal.

In the absence of any documented neutron-dependent fluorescence wavelength spectra for the $Li_2B_4O_7$ single crystal, measurement was made using 5.4 MeV alpha particles that would produce virtually the same fluorescence wavelength spectrum. This is based on the fact that the ionizing radiation generated through the neutron capture reaction is $^{4}$He (alpha particles) as mentioned in Example 3. The source of alpha particles was $^{241}$Am. The obtained fluorescence wavelength spectrum is depicted in FIG. 7.

Figure 8:
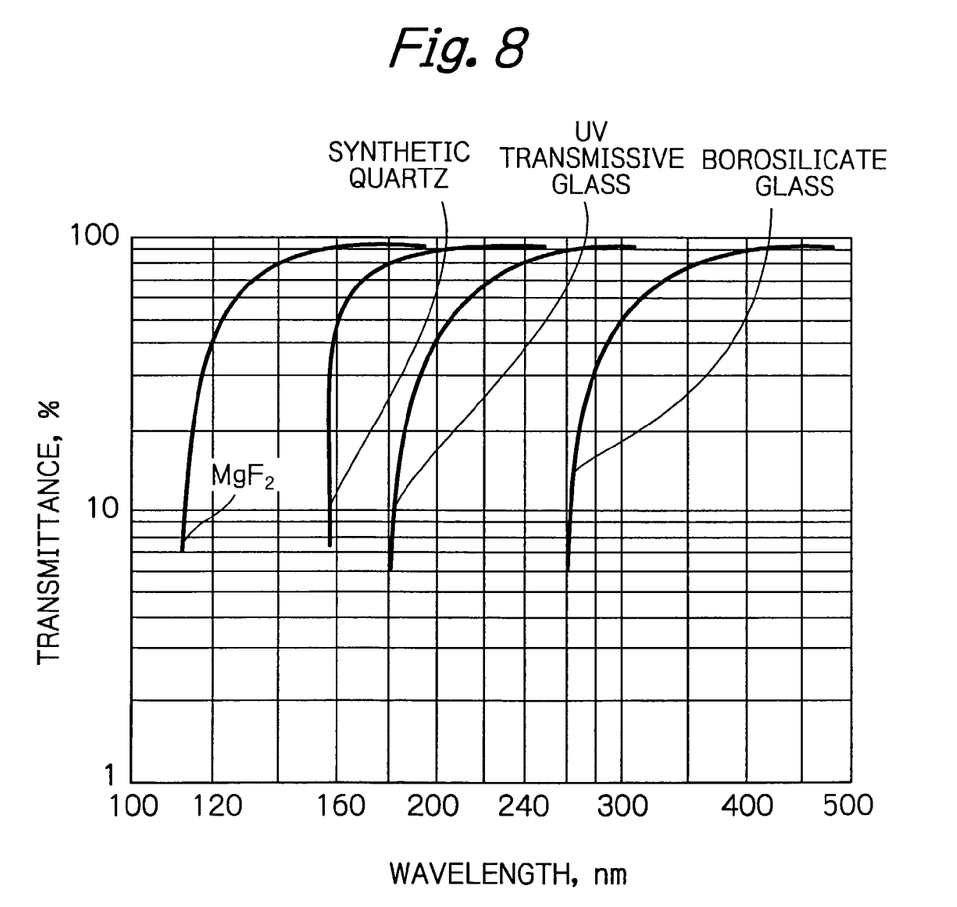
FIG. 8 is a graph showing the transmittance characteristics of the incident window materials listed in a catalog of electron tubes manufactured by Hamamatsu Photonics.

The fluorescent yield was about 70% in a wavelength range below 350 nm. The conventional photomultiplier tube uses borosilicate glass as a window material, so its detection efficiency is known to drop sharply at wavelengths below 350 nm. It was therefore decided that the window of the photomultiplier tube for detecting the fluorescence from the $Li_2B_4O_7$ single crystal should be made of synthetic quartz glass or uv transmissive glass that had the characteristics shown in FIG. 8 (a catalog for electron tubes manufactured by Hamamatsu Photocnics). R647P of Hamamatsu Photonics which was used as a photomultiplier tube in Example 5 was replaced by R760 using synthetic quartz glass as a window material or by R960 using uv transmissive glass. These photomultiplier tubes could detect fluorescence without loss.

EXAMPLE 7

Figure 9:
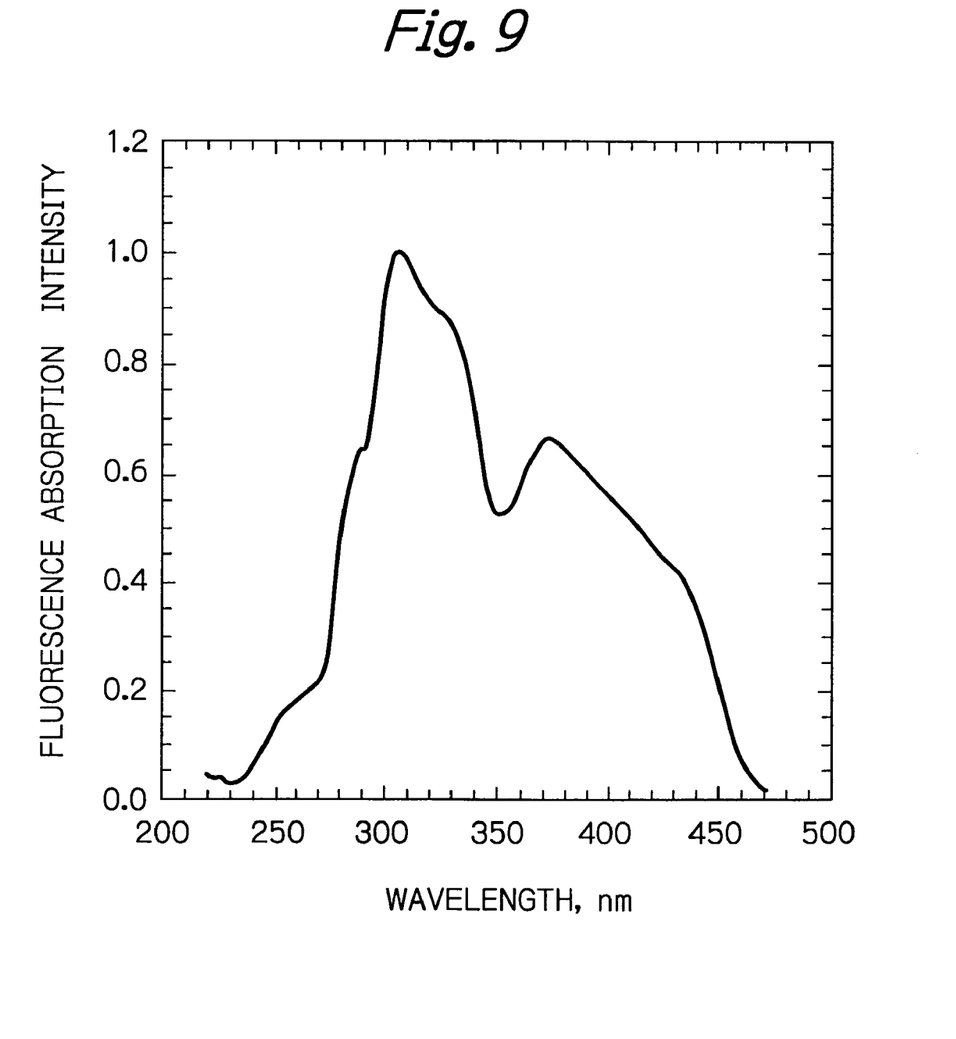
FIG. 9 is a graph showing in detail the result of measurement of the absorption wavelength characteristic of BCF-92, a wavelength shifting fiber manufactured by Bicron Co., U.S.A.
Figure 10:
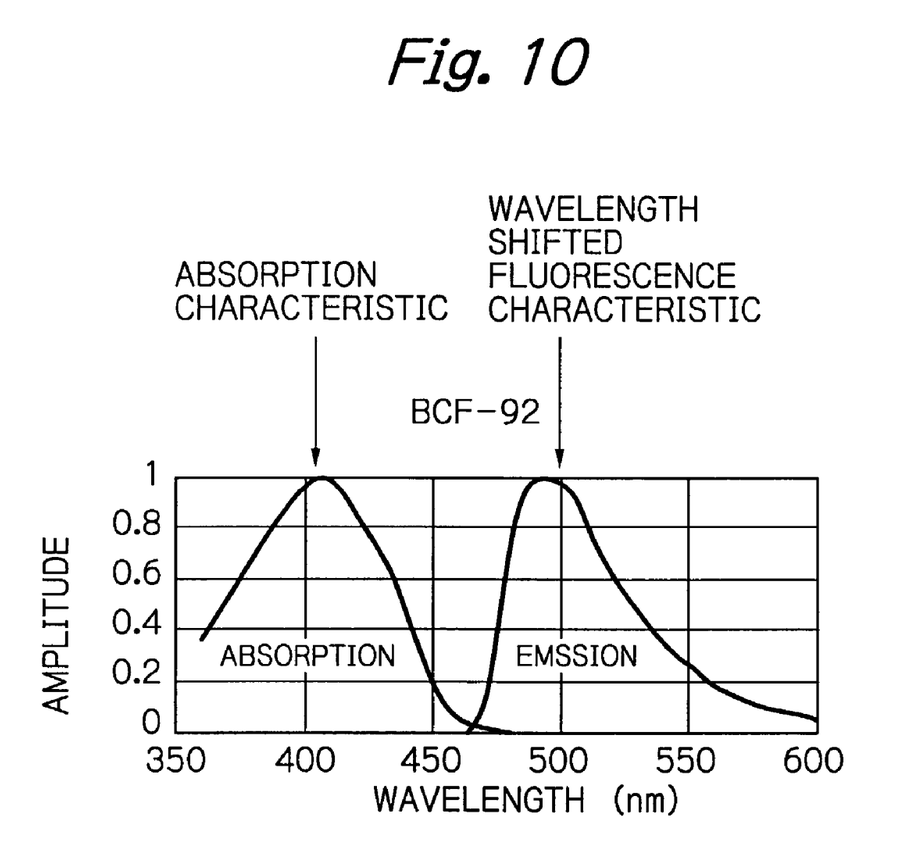
FIG. 10 is a graph showing side by side the absorption wavelength characteristic set forth in the catalog of BCF-92 (Scintillating Optical Fibers Catalog) and the fluorescence wavelength characteristic after wavelength shifting.

The neutron detecting scintillator composed of the $Li_2B_4O_7$ single crystal produced a fluorescence wavelength spectrum which, as shown in FIG. 9, spread from 250 nm to 450 nm, with a peak at 330 nm. Wavelength shifting fibers having fluorescence absorption ranges that covered such a wide range of fluorescence spectra are not found in any of the catalogs published by manufacturers of wavelength shifting fibers, so the inventors performed fine measurement of the fluorescence absorption wavelength bands of commercially available wavelength shifting fibers. As a result, BCF-92 and BCF-91, two wavelength shifting fibers manufactured by Bicron Co., U.S.A., were found to have an absorption wavelength band that was not listed in their catalog (Bicron Co., Scintillating Optical Fibers catalog). Comparing those absorption wavelength bands with the fluorescence wavelength spectrum of the $Li_2B_4O_7$ single crystal, the inventors confirmed that the efficiency of wavelength shifting could be increased by using BCF-92 having two fluorescence absorption ranges, one extending from 250 nm to 350 nm as shown in FIG. 9 and discovered by the inventors and the other extending from 350 nm to 450 nm as documented in the catalog of Bicron Co. As FIG. 10 shows, the wavelength shifted fluorescence spectrum had a central peak at 490 nm. BCF-91 was also applicable but it was less efficient than BCF-92 in wavelength conversion because of an offset absorption wavelength band.

Figure 11:
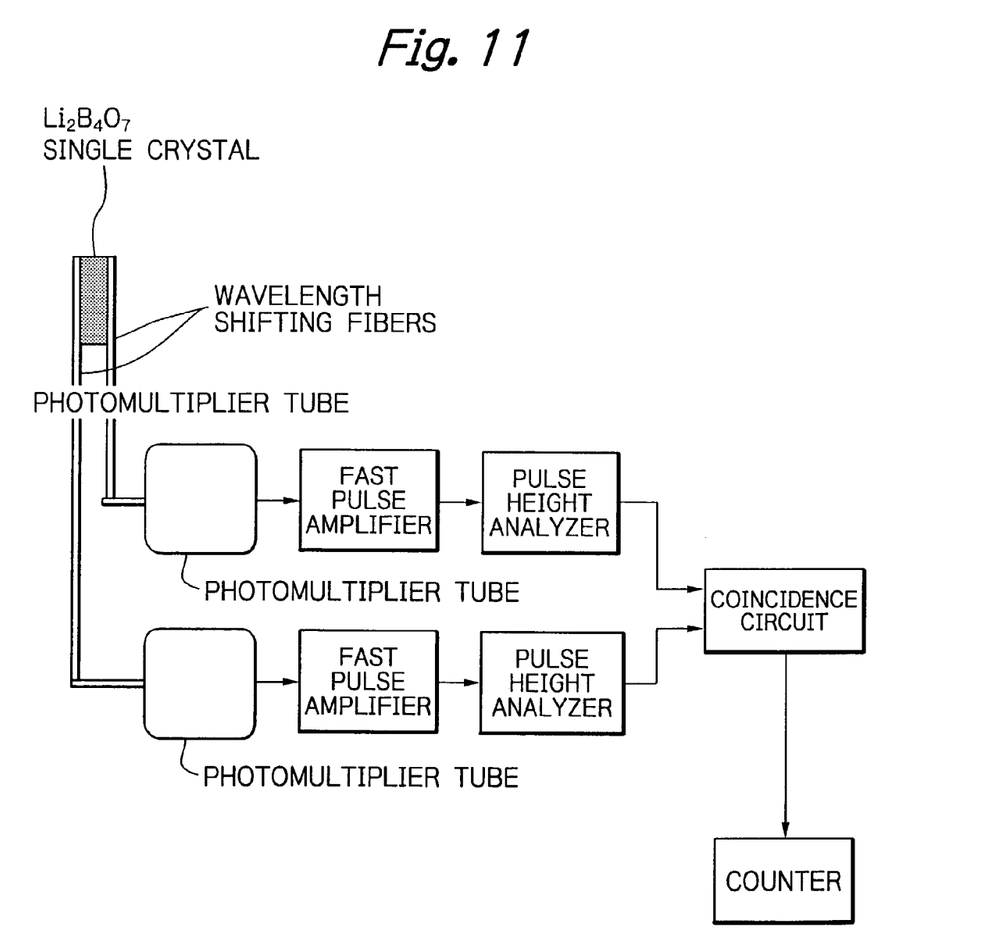
FIG. 11 is a block diagram for a neutron detector that detects neutrons using wavelength shifting optical fibers in combination with a neutron detecting scintillator made of the $Li_2B_4O_7$ single crystal.

FIG. 11 is a block diagram for the neutron detector used in Example 7 which was constructed by combining BCF-91 with the neutron detecting scintillator made of the $Li_2B_4O_7$ single crystal. The scintillator was a 0.4-mm thick $Li_2B_4O_7$ single crystal of NEL that used natural Li and natural B. This single crystal was cut to a size of 3 mm×3 mm and a bundle of six parallel wavelength shifting fibers (BCF-92) each having a diameter of 0.5 mm was attached to both sides of the single crystal as shown in FIG. 11. The two fiber bundles were respectively connected at the other end to two photomultiplier tubes. R647P of Hamamatsu Photonics was used as each photomultiplier tube. The scintillator, the wavelength shifting fibers and the photomultiplier tubes were then surrounded with an aluminum foil and a light-proof sheet. Neutrons were launched into the scintillator composed of the $Li_2B_4O_7$ single crystal and the resulting neutron capture reaction generated an ionizing radiation which in turn emitted fluorescence with a decay time of no longer than 10 ns. The emitted fluorescence was multiplied with the photomultiplier tubes and picked up as two fast pulsed current signals each having a pulse duration of no longer than 30 ns. A voltage of −1100 V was applied to the photomultiplier tubes. These signals were amplified 10-fold with PM Amplifier No. 18 of Hoshin Denshi which was a fast pulse amplifier having a frequency band of 100 MHz. The amplified pulsed signals were subjected to pulse height analysis with Discriminator No. 19 of Hoshin Denshi which was a pulse height analyzer having a maximum input rate of 60 MHz. After pulse height analysis, the two neutron detection signals were supplied into Coincidence Circuit No. 18 of Hoshin Denshi. The coincidence time was 30 ns. The coincidence signal that was output in response to the coming of two simultaneous input signals was counted with 120 MHz Counter No. 26 of Hoshin Denshi (CAMAC module operating at 120 MHz) to give counts of neutron incidence. Coincidence has the advantage of eliminating the background due to the fast pulses the photomultiplier tubes generate by themselves. In this way, fast neutrons incident at 10 Mcps or more can be detected. In a neutron standard field using $^{252}$Cf, the efficiency of detecting thermal neutrons launched into the scintillator made of the 3 mm×3 mm $Li_2B_4O_7$ single crystal was measured and neutron detection was possible with an efficiency of 9%. In the measurement, the optical system and the electronic circuitry were not optimized, so the actual detection efficiency would be at least twice as high.

Thus, the system using wavelength shifting fibers enabled neutrons at a very high counting rate ($\geq 10$ Mcps) to be measured by remote control from a far-away site.

EXAMPLE 8

Figure 12:
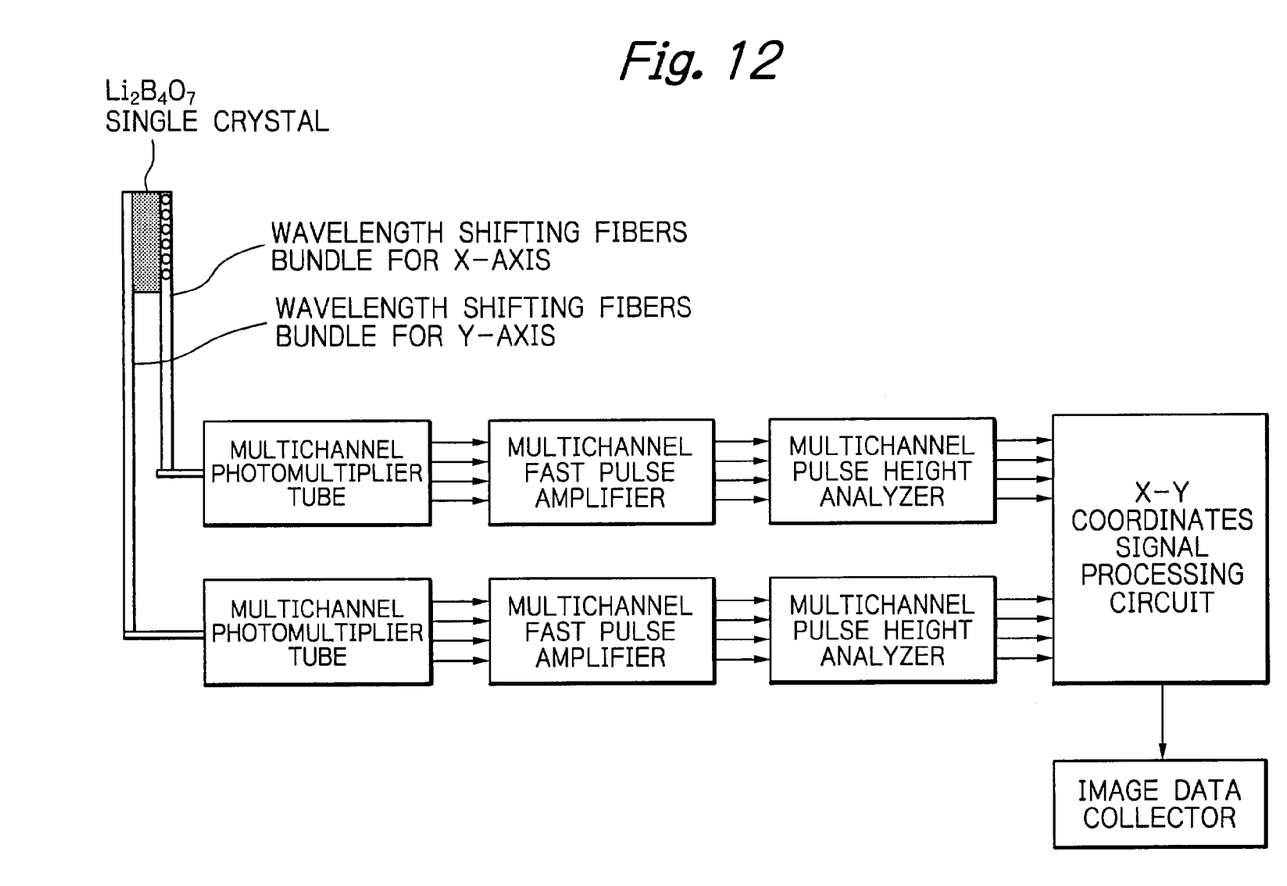
FIG. 12 is a block diagram for a neutron imaging detector that detects a neutron image using wavelength shifting optical fibers in combination with a neutron detecting scintillator made of the $Li_2B_4O_7$ single crystal.

The neutron detector used in Example 8 was adapted to detect a neutron image. The neutron detecting scintillator was a 0.4-mm thick $Li_2B_4O_7$ single crystal of NEL that used natural Li and natural B and which measured 3 mm by 3 mm. A bundle of six parallel wavelength shifting fibers (BCF-92) each having a diameter of 0.5 mm was attached to both sides of the single crystal as shown in FIG. 12. The two fiber bundles were respectively connected at the other end to two multichannel photomultiplier tubes. As each multichannel photomultiplier tube, the 16-ch multianode photomultiplier tube of Hamamatsu Photonics was used. The scintillator, the wavelength shifting fibers and the multianode photomultiplier tubes were then surrounded with an aluminum foil and a light-proof sheet. A voltage of −900 V was applied to the multianode photomultiplier tubes.

The six signals from each multianode photomultiplier tube were amplified 10-fold with PM Amplifier No. 18 of Hoshin Denshi which was a fast pulse amplifier having a frequency band of 100 MHz. The amplified pulsed signals were subjected to pulse height analysis with Discriminator No. 19 of Hoshin Denshi which was a pulse height analyzer having a maximum input rate of 60 MHz. In order to establish the position of neutron incidence, the six pulse height analyzed neutron detection signals from the X-axis fibers and Y-axis fibers were supplied into an X-Y coordinates signal processing circuit, which determined the position of neutron incidence by the crossed-fiber positioning method (D. P. Hutchinson et al., Proceedings of SPIE, vol. 3769–11 (1999)) in which an X-axis fiber and a Y-axis fiber from which fluorescence was detected on account of neutron incidence were chosen and the point at which the two fibers crossed was determined as the position of neutron incidence. The thus determined position of neutron incidence was recorded with an image data collector. Thus, using the $Li_2B_4O_7$ single crystal as the neutron detecting scintillator and combining it with the wavelength shifting fiber BCF-92, one could determine the position of fluorescing to thereby obtain the image of fast neutrons incident at 10 Mcps or more. In a neutron standard field using $^{252}$Cf, a neutron beam of 0.6 mm$^\Phi$ was applied through a neutron collimator which was a 1-mm thick Cd plate having a 0.6-mm$^\Phi$ hole in the center and the efficiency of detecting thermal neutrons launched into the neutron imaging device made of the 3 mm×3 mm $Li_2B_4O_7$ single crystal was measured: neutron imaging was possible with an efficiency of 13%. In the measurement, the optical system and the electronic circuitry were not optimized, so the actual detection efficiency would be at least twice as high.

The neutron imaging detector that is essential in the neutron scattering experiment by the time-of-flight method using high-intensity pulsed neutrons requires high counting rate, wide neutron energy range and low-gamma ray detectability, so it has been desired to develop a neutron detecting scintillator that has a very short decay time, that can capture neutrons in high efficiency and that is composed of light elements. These requirements are fully met by the neutron detecting scintillator of the invention that uses an LBO single crystal (either the $Li_2B_4O_7$ single crystal or the $LiB_3O_4$ single crystal). For large-area neutron imaging, it has been desired to develop an inexpensive neutron detecting scintillator. The $Li_2B_4O_7$ single crystal also satisfies this need since being a material in consumer use to filter elastic waves, this single crystal is currently manufactured in sizes of 4–6 inches and therefore available at less than a tenth of the cost of the conventional Li glass scintillators.

What is claimed is:

1. A neutron detecting scintillator which consists of an LBO single crystal having a fluorescence wavelength spectrum with a peak at 330 nm selected from the group consisting of a $Li_2B_4O_7$ single crystal and a $LiB_3O_4$ single crystal, into which neutrons are launched,
   wherein said LBO single crystal is enriched in an isotope selected from the group consisting of $^6$Li or $^{10}$B, and
   wherein fluorescence emitted from an ionizing radiation generated through a neutron in the crystal has a short-lived component not longer than 10 ns.

2. The neutron detecting scintillator according to claim 1, wherein the Li or B isotope in the LBO single crystal consists of natural Li or natural B.

3. A neutron detector which comprises the neutron detecting scintillator according to claim 2, further comprising a photomultiplier tube that processes said fluorescence, which is picked up as a fast pulsed current signal having a pulse duration of no longer than 30 ns, a pulse height analyzer to receive the fast pulsed current signal either directly or after amplification with a fast pulse amplifier, and a counter counts that the pulses to detect the incident neutrons.

4. The neutron detector according to claim 3 wherein the window of the photomultiplier tube is made of synthetic quartz glass or uv transmissive glass.

5. A neutron detector which comprises the neutron detecting scintillator according to claim 2, further comprising a wavelength shifting fiber having two fluorescence absorption bands, one ranging from 250 nm to 350 nm and the other ranging from 350 nm to 450 nm, to shift the wavelength of the fluorescence.

6. A neutron detector which comprises the neutron detecting scintillator according to claim 2, further comprising at least four units of a wavelength shifting fiber having two fluorescence absorption bands, one ranging from 250 nm to 350 nm and the other ranging from 350 nm to 450 nm, to shift the wavelength of the fluorescence.

7. The neutron detecting scintillator according to claim 1, wherein the Li in the LBO single crystal is enriched by at least 90% in $^6$Li or the B is enriched by at least 99% in $^{10}$B.

8. A neutron detector which comprises the neutron detecting scintillator according to claim 7, further comprising a photomultiplier tube that processes said fluorescence, which is picked up as a fast pulsed current signal having a pulse duration of no longer than 30 ns, a pulse height analyzer to receive the fast pulsed current signal either directly or after amplification with a fast pulse amplifier, and a counter to count the pulses to detect the incident neutrons.

9. The neutron detector according to claim 8 wherein the window of the photomultiplier tube is made of synthetic quartz glass or uv transmissive glass.

10. A neutron detector which comprises the neutron detecting scintillator according to claim 7, further comprising a wavelength shifting fiber having two fluorescence absorption bands, one ranging from 250 nm to 350 nm and the other ranging from 350 nm to 450 nm, to shift the wavelength of the fluorescence.

11. A neutron detector which comprises the neutron detecting scintillator according to claim 7, further comprising at least four units of a wavelength shifting fiber having two fluorescence absorption bands, one ranging from 250 nm to 350 nm and the other ranging from 350 nm to 450 nm, to shift the wavelength of the fluorescence.

12. The neutron detecting scintillator according to claim 1, wherein the LBO single crystal Li and B isotopes consist of natural Li and B enriched by at least 90% in $^{10}$B.

13. A neutron detector which comprises the neutron detecting scintillator according to claim 12, further comprising a photomultiplier tube that processes said fluorescence, which is picked up as a fast pulsed current signal having a pulse duration of no longer than 30 ns, a pulse height analyzer to receive the fast pulsed current signal either directly or after amplification with a fast pulse amplifier, and a counter to count the pulses to detect the incident neutrons.

14. The neutron detector according to claim 13 wherein the window of the photomultiplier tube is made of synthetic quartz glass or uv transmissive glass.

15. A neutron detector which comprises the neutron detecting scintillator according to claim 12, further comprising a wavelength shifting fiber having two fluorescence absorption bands, one ranging from 250 nm to 350 nm and the other ranging from 350 nm to 450 nm, to shift the wavelength of the fluorescence.

16. A neutron detector which comprises the neutron detecting scintillator according to claim 12, further comprising at least four units of a wavelength shifting fiber having two fluorescence absorption bands, one ranging from 250 nm to 350 nm and the other ranging from 350 nm to 450 nm, to shift the wavelength of the fluorescence.

17. A neutron detector which comprises the neutron detecting scintillator according to claim 1, further comprising a photomultiplier tube that processes said fluorescence, which is picked up as a fast pulsed current signal having a pulse duration of no longer than 30 ns, a pulse height analyzer to receive the fast pulsed current signal either directly or after amplification with a fast pulse amplifier, and a counter that counts the pulses to detect the incident neutrons.

18. The neutron detector according to claim 17, wherein the window of the photomultiplier tube is made of synthetic quartz glass or uv transmissive glass.

19. A neutron detector which comprises the neutron detecting scintillator according to claim 1, further comprising a wavelength shifting fiber having two fluorescence absorption bands, one ranging from 250 nm to 350 nm and the other ranging from 350 nm to 450 nm, to shift the wavelength of the fluorescence.

20. A neutron detector which comprises the neutron detecting scintillator according to claim 1, further comprising at least four units a wavelength shifting fiber having two fluorescence absorption bands, one ranging from 250 nm to 350 nm and the other ranging from 350 nm to 450 nm, to shift the wavelength of the fluorescence.

21. A neutron detector comprising a neutron detecting scintillator, a wavelength shifting fiber, a photomultiplier tube, a fast pulse amplifier, a pulse height analyzer and a neutron incidence counter, wherein said scintillator consists of an LBO single crystal selected from the group consisting of a $Li_2B_4O_7$ single crystal and a $LiB_3O_4$ single crystal, each of the $Li_2B_4O_7$ single crystal and the $Li_2B_4O_7$ single crystal are independently selected from the group consisting of natural Li and natural B, single crystals comprising Li enriched by at least 90% in $^6$Li and B enriched by at least 99% in $^{10}$B, and natural Li and B enriched by at least 90% in $^{10}$B, into which neutrons are launched, the neutron capture reaction with a neutron launched into the crystal generates an ionizing radiation which in turn emits fluorescence with a decay time of no longer than 10 ns, and said LBO single crystal has a fluorescence wavelength spectrum with a peak at 330 nm;

wherein the scintillator is combined with the wavelength shifting fiber having two fluorescence absorption bands, one ranging from 250 nm to 350 nm and the other ranging from 350 nm to 450 nm, to cover a wide range of fluorescence produced by the single crystal;

wherein the photomultiplier tube processes the fluorescence, which is picked up as a fast pulsed current signal having a pulse duration of no longer than 30 ns, wherein the pulse height analyzer receives the fast pulsed current signal either directly or after amplification with the fast pulse amplifier, and wherein the neutron incidence counter counts the pulses to detect the incident neutrons.

22. A neutron detector according to claim 21, wherein the window of the photomultiplier tube is made of synthetic quartz glass or uv transmissive glass.

* * * * *